United States Patent [19]

Hjelm et al.

[11] Patent Number: 4,766,501
[45] Date of Patent: Aug. 23, 1988

[54] METHOD FOR SPLICING NON-CONSECUTIVE VIDEO SIGNAL FRAMES

[75] Inventors: Anders Hjelm, Spånga; Tommy Heinermark, Sollentuna, both of Sweden

[73] Assignee: AB Film-Teknik, Solna, Sweden

[21] Appl. No.: 803,287

[22] PCT Filed: Mar. 5, 1985

[86] PCT No.: PCT/SE85/00100
§ 371 Date: Nov. 6, 1985
§ 102(e) Date: Nov. 6, 1985

[87] PCT Pub. No.: WO85/04066
PCT Pub. Date: Sep. 12, 1985

[30] Foreign Application Priority Data

Mar. 8, 1984 [SE] Sweden ............................... 8401297

[51] Int. Cl.⁴ .............................................. H04N 5/76
[52] U.S. Cl. ..................................... 358/311; 360/14.1
[58] Field of Search ......................... 358/310, 311, 16; 360/13, 14.1, 14.2, 14.3

[56] References Cited

U.S. PATENT DOCUMENTS 4,052,733 10/1977 Devenbecker, Jr. .................. 358/10

OTHER PUBLICATIONS

E.B.U. Review #172, pp. 265-281, Dec. 1978.

Primary Examiner—Robert L. Richardson
Attorney, Agent, or Firm—Pollock, Vande Sande & Priddy

[57] ABSTRACT

A method for editing and splicing color videograms. A first video tape machine records videogram sequences contained on a video tape in a second machine. The sequence includes a first frame series terminated with a final frame and a second frame series which begins with a first frame. A discontinuity between the first and second frames is detected when the chrominance coding of the adjacent recorded frames is found to be the same instead of on an alternate basis. Each frame of the second frame series is shifted under these conditions in order that each video line subsequent to the first video line is shifted forward. The first video line is reduced to a black level. The method avoids the consequences of a splice between groups of frames when the frames on each side of the splice do not have the required opposite chrominance coating.

5 Claims, 3 Drawing Sheets

|  | NORMAL | DISPLACED |
|---|---|---|
| ------ ——— | 23 | 24 |
| ——————— | 336 | 337 |
| ——————— | 24 | 25 |
| ——————— | 337 | 338 |
| ——————— | 25 | 26 |
| ——————— | 309 | 310 |
| ——————— | 622 | 623 |
| ——————— | 310 | 311 |
| ————---- | 623 | 624 |

METHOD FOR SPLICING NON-CONSECUTIVE VIDEO SIGNAL FRAMES

The invention relates to a method in the so-called cutting of recorded color television signals for editing purposes, and in particular signals according to PAL and SECAM standards.

In order to comprehend the present invention, it is necessary to have some knowledge of the aforesaid signal transmission and recording systems, upon which much has been written. A brief disclosure will now be made of the nature of the problem which the invention is meant to solve. The invention will be primarily described with a starting point from the PAL-system, although it will be understood that a similar problem also exists in the SECAM-system, this problem also being solved by the invention, and in the NTSC-system.

It is known that a conventional TV-signal reproduces 25 frames per second, each divided into two fields each of which sweeps interdigitally 312½ lines, or together 625 lines. The color information exists in the form of a luminance signal, which is compatible with black and white reception, and a chrominance signal, which exists as a sideband of a suppressed carrier wave at a frequency spacing of approximately 4.43 MHz from the luminance signal. In the PAL-system the chrominance signal, from which two scalar color signals shall be taken in order to calculate together with the amplitude of the luminance signal the three color signals, is transmitted in phase quadrature wherewith the chrominance signal is displaced in phase through 180° for each alternate line, in order to compensate for phase errors when de-coding. In the SECAM-system the one component is instead transmitted in each alternate line and the second component in each other line, wherewith calculation of the three color signals is effected with the aid of the one component directly and the other component taken from a preceding line, collected from a delay line.

Thus, a fundamental principle of both the PAL and the SECAM systems is that the information is not similarly coded in two mutually sequential lines, but that said lines have opposite chrominance coding and must each be decoded in a manner peculiar thereto. Now, if the number of lines in a TV-frame (two fields, 625 lines) had been an even number, then the problem solved by the invention would never have existed. It has not been possible, however, to avoid an uneven number of lines, because of the problem of interlacing between the fields.

Decoding of the chrominance signal in the PAL-system is effected by means of a reference signal (color carrier wave $f_o$) obtained from an oscillator which is normally crystal controlled and which is phase locked to a series of short carrier-wave transmissions, which take place over horizontal and vertical retrace periods, or blanking intervals. During these burst phases, the transmitted carrier-wave frequency is phase-displaced alternately through $+135°$ and alternately through $-135°$ in relation to the ideal oscillator frequency. The task of signal "cutting", in which a series of frames with relevant control signals are placed one after the other in immediate sequence on, for example, a video tape (or during transmission) can be beset with certain problems since the periodicity of the control signals does not coincide exactly with the frequency of the frames.

For example, in the case of the PAL-system the periodicity is equally divisible by a period corresponding to four frames (eight fields), at least if the horizontal synchronizing (sync) signals $f_H$ and the color carrier-wave $f_o$ originate from one and the same oscillator frequency according to the formula $$f_H = \frac{4 f_o}{1135 + 4/625}$$

which is recommended by CCITT. This equation can be written as $$f_H = \frac{4 \cdot 625}{709\,379} f_o$$

or $$f_H = \frac{4 \cdot 5^4}{709\,379} f_o$$

It will be seen immediately that the denominator and the numerator lack common integer factors (the denominator is an odd number and does not end in 0 or 5), and that the two frequencies are equally divided after 4.625 periods for $f_H$, corresponding accordingly to four frames. Thus, in this respect four types of frames can suitably be discerned, and can be designated I, II, III and IV. Two frame sequences can be spliced with no problem whatsoever from the control signals, provided that there is no interruption in consecutivity in this respect, i.e. provided that one proceeds from I to II, II to III, III to IV or IV to I from one sequence to the next. (The periodicity is therefore four frames or eight fields.)

For the sake of simplicity this type of splice will be referred to as splice-type A. Splice-type A can always be practiced, although when one is bound to this type of splice it places compulsory conditions upon the cutting procedure. "Cutting" of film in the classical mode is, after all, effected to an accuracy of one frame, and in many instances it may be of actual importance that so is the case. It can be noted that a conventional feature film is composed of 800–1200 spliced scenes, and hence simple and problemfree cutting is a necessity.

It was seen in the aforegoing that both the PAL and the SECAM systems employ a line-to-line signal switch providing some form of symmetry with the period two frames (which accordingly together have an even number of lines). Consequently, it is conceivable to splice between two frames from even to odd numbers or from odd to even numbers according to the same designation (that is from I to IV, II to I, III to II or IV to III). This type of splice is referred to here as splice type B. Since, as before shown, the color carrier wave is evenly divided by four frames, but not by two frames, it is obvious that four frames contain an odd number of periods of the color carrier wave, and hence it will be seen that there is a phase difference between the spacing of two frames which reaches to 180° or one half of a period. This can be corrected in a tape machine in a known manner, with the aid of a time base corrector which delays the line signal for a suitable length of time. There is then obtained a displacement corresponding to 1/567 of a frame line occurring as a lateral shift in the frame. This has no disturbing influence when the scenes are dissimilar, but can have a disturbing effect when concerning animated film or cartoons.

These types of splices have hitherto been considered the only ones possible. It has been considered impossible by all those skilled in this art to cut a frame at just any point, because of the structure of the control signal.

An object of the present invention is to eliminate this limitation and to enable a frame to be cut at any desired point, i.e. to make it possible to "splice" the signals at any selected frame sequence.

Table I illustrates all conceivable frame sequencies in a splice. As disclosed in the aforegoing the splice types A and B are known and practiced.

TABLE I

| Last Picture | First picture after splice-splice type | | | |
|---|---|---|---|---|
| | A | B | $C_1$ | $C_2$ |
| I | II | IV | I | III |
| II | III | I | II | IV |
| III | IV | II | III | I |
| IV | I | III | IV | II |

The problem is now the splice types $C_1$ and $C_2$ shown in the Table, this problem, as it has appeared, being that the correspondence between chrominance signal and reference phase in the color carrier wave is so poor that after a cut the colors are initially wrong (this is equally true for both PAL and SECAM). If the splice is carried out in spite of this, the subsequent disturbance in picture reception will be quite noticeable and the origin of this disturbance can be readily discerned by one knowledgeable in these matters.

This problem is solved by means of the present invention with the aid of a method of the kind set forth in the introduction.

SUMMARY OF THE INVENTION

Thus, a fundamental feature of the invention is that there is ensured a consistent change in the coding of the chrominance signal even in those signal "cuts" where the coding is naturally wrong. Although it is admittedly possible to cut when this is not done, the receiver or monitor receiving the signals will "get out of step" and it will take a longer or shorter period of time for the error to compensate itself, in the case of the PAL-system a time corresponding to half a frame, since the color carrier wave oscillator in the television apparatus must have time to re-phase. Accordingly, in the case of an editing splice of the aforesaid kind, the first line in each frame is "discarded" when proceeding in accordance with the invention.

When viewing the result on a screen this means that there is obtained a vertical displacement equal to one line spacing—the picture is displaced vertically on the screen through a full line spacing, which corresponds to 1/300 of the picture height. This presents no disadvantage in motivational changes. In the case of animated pictures, however, such displacement is generally unsuitable, as it is also with the aforesaid splice type B (Table I) since in these cases there is also a lateral shift which corresponds to half a period in color oscillator frequency.

In practice the invention can be applied with the aid of conventional studio-type tape machines with but few complicated auxiliary devices. These machines, equipped with a time base corrector, operate in principle with digitized signals. In playback modes, the signals are digitized line for line and are read into FIFO-type memory stores from which they can be later read-out and re-converted to analogue signals and recorded on video-tape. Such machines are well known and can be acquired from AMPEX, Marconi or SONY. The change of signal sequences for different lines as envisaged with the invention can be readily effected due to the fundamental construction, which is designed to enable transcription to be effected from one tape to another with compensation for all eventual speed variations while maintaining synchronization.

The invention will now be described with reference to an embodiment according to the PAL-system and with reference to the accompanying drawings.

DESCRIPTION OF THE PREFERRED EMBODIMENT

Figure 1:
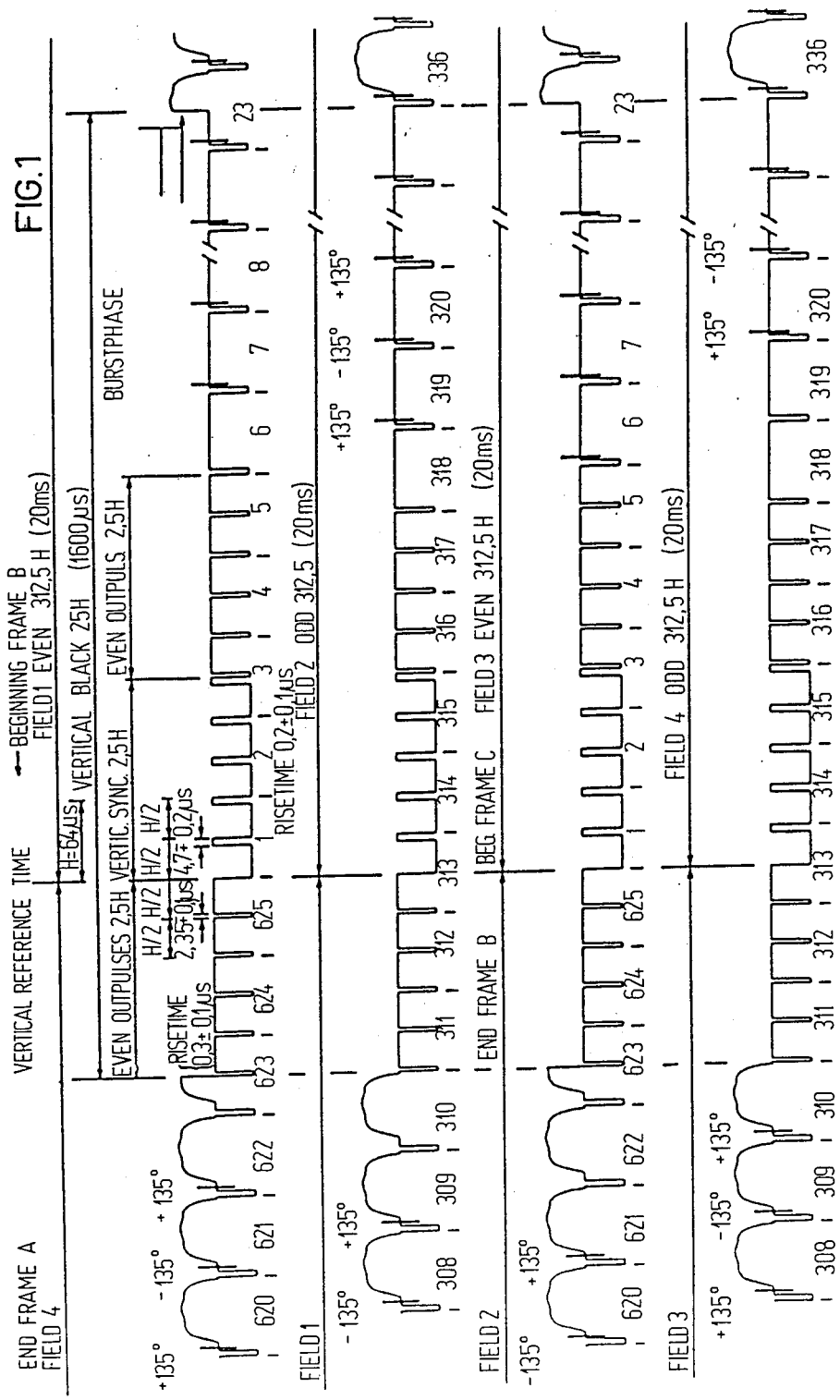
FIG. 1 is a conventional diagrammatic illustration of the signal sequence in the PAL-system.
Figures 2, 3:
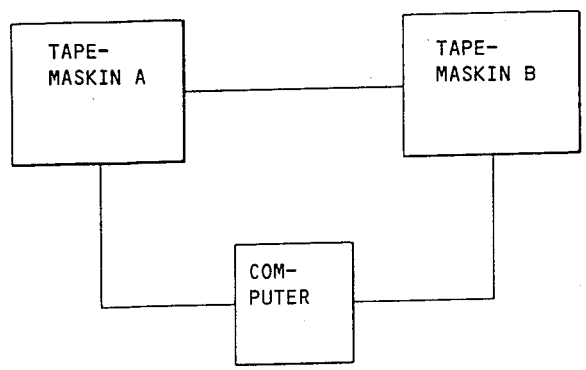
FIG. 2 shows how the invention functions.
FIG. 3 is a block schematic.

FIG. 1, which is taken from a standard manual on the PAL-system, shows how the fields alternate in the system and how the various line signals and burst phases are placed in relation to the vertical retrace period or vertical blanking interval, which has a duration of 25 lines, and of which there are two per frame. Of the 625 lines which make up a frame period, there are thus only 575 visible lines, starting with the latter part of line 23. The first field is terminated with line 310 and thereafter follows line 336, which after a vertical retrace is placed between the sites for lines 23 and 24, line 337 etc. to line 623, which is only a half. This is also illustrated in FIG. 2, which illustrates the line placement symbolically.

As mentioned in the introduction, when splicing in accordance with the invention under certain conditions one line is discarded. One such case can be illustrated through FIG. 1.

The phasing of the burst signals is illustrated in FIG. 1 by designations $+135°$ and $-135°$ respectively. Assume now that the end of the frame A which terminates in (the black) the line 625 uppermost, which falls in a vertical retrace period, is to be spliced with frame C in the diagram. In frame A we see that the phase of the last burst phase (in line 622) is $+135°$ and that the plus phase consequently lies in lines having an even number. In frame B in the diagram the first burst phase lies in line 7 and has the phase $+135°$. In this case the plus phase thus lies in an odd-numbered line, and this adaptation is correct since the chrominance coding changes therewith. If we now wish to pass over frame B in the diagram we see that in frame C the burst phase lies in line 6 and has the phase $+135°$. If such a splice were to be made a phase error of 180° would result between the burst and the color carrier-wave oscillator in a receiver. However, if it were possible to adjust the oscillator immediately to the correct timing, no problem would exist; no such possibility exists in practice, however. (A corresponding adjustment in the SECAM-system would be still more troublesome). As a result, the coding will be wrong when color signals arrived from and including line 23.

When proceeding in accordance with the invention phasing is synchronized and a jump is made over one line in the system. When reconstituting the video signal, which is effected during the aforesaid transcription, the burst phases are permitted to continue in the same manner in the preceding and the following section, meaning that frame C obtains a positive phase in even numbered lines. When the site on the video tape corresponding to line 23 is located in front of the head there is placed at said location a black level, whereafter the signal sequence belonging to line 25 is placed in the site for line 24, etc . . . . As will be seen from the continuation of the diagram, this means that information intended for line 310 lands in line 309 and that line 310 is empty of information and extinguished. The scanning functions continue in a normal fashion and the signal sequence intended for line 324 lands in line 323 in place of the information intended for line 323, which latter arrives in the vertical retrace. Ultimately the signal sequence intended for line 623 will fall in line 622 and line 623 will be devoid of information. In other words, when shown on the screen the frame will be displaced through a vertical distance corresponding to two lines.

It has been noted in the introduction that the color carrier-wave frequency is divided equally over four frames (8 fields) but over this period consequently has an odd number of periods. It will be understood that since the color carrier-wave has one and the same phase at both ends thereof, the carrier-wave must have been displaced through one half period in the center of such an interval. A splice which is to give the correct phase must take this into account. This is done by controlling the transmitted digitized frame signal through the time base corrector with a corresponding time shift of one half period. This corresponds to roughly 1/567 of a line, or roughly in the order of one millimeter. It will also be seen that a division of the 8-field interval into four parts will result in the need to compensate for phase shifts relative to the ends of the interval of $\pi/2$, $\pi$ and $3\pi/2$, if coding is to be correct. These are thus corresponded by cases $C_1$, B and $C_2$ respectively in Table I. Thus, there is obtained in all of these cases a horizontal shift of varying magnitude, due to the influence of the time base corrector.

The invention is normally carried into practice with the aid of a data processor arranged to control the two tape machines, as illustrated in FIG. 3.

In the following there is described by way of example a non-limiting embodiment of a method according to the invention as applied to an apparatus designated AMPEX VPR 2B, which records on one-inch tape type C.

When recording on tape of the kind meant here, there is recorded in addition to sound and video signals also a control track. This track contains information as to how the signal on the tape is recorded and is operative during play-back to lock the tape feed to a separate station reference (crystal controlled) generated in the machine.

This control signal contains a negative pulse at the beginning of all odd-numbered fields, a positive pulse at the beginning of all even-numbered fields, and a pulse train of particular appearance (negative+positive+-negative) at the beginning of each eighth field (field 1 in 8-field sequences). When the tape is played back there is generated at the correct playback speed an internal 8-field pulse (one for each fourth frame, i.e. 6.25 Hz), a 4-field pulse (12.5 Hz) and a 2-field pulse (25 Hz).

At the same time, signals corresponding to these three signal series are generated from the synchronizing equipment of the station, and tape movement is locked in to these signals. In addition there is generated a so-called PAL-phase-signal having a pulse for each alternate line, i.e. with the frequency 7.8 kHz, which indicates when the color signal shall be inverted or normal.

The actual locking-on of the tape machine is effected in the following manner: the servomechanism responsible for tape speed operates at 95% of the nominal speed, at which the control signals of the station and the tape are accordingly displaced progressively towards each other until there is coincidence between the two, whereupon the tape-speed servomechanism is caused to lock-in the correct speed. With commercially available machines it is then possible to lock-in 8-field correct, although it can also be decided to lock-in 4-field correct, whereupon the 6.25 Hz-condition no longer applies.

In one example of how the present invention can be applied, there is used a plurality of tapes upon which film has been recorded and which are therewith provided with control tracks. Also present in one of the sound channels (at times in the vertical-sweep component of the video signal) a frame-marking in hours, minutes and seconds and frame-number (25 frames per second). Prior to cutting, the editor chooses which scenes shall be present on the final tape and lists the frame-markings successively for the first and second frame of each scene. This can be done in a variety of ways. One of the least expensive methods in this respect is to work with a copy transferred onto a simpler VH5-cassette, where each frame is provided in a known manner with a visible frame marking as the film is copied from one tape to the other. The list is then used in the final editing or cutting stage.

The video-tape which is to receive the final edition of the video-film is then prepared in a tape machine, by providing the tape with a continuous control signal and with frame markings in running order in the sound channel intended therefor. The film is then copied from the original tape onto a copy tape. The now prepared copy tape is placed in a first tape machine and a first original tape is placed in a second tape machine. It is assumed that it is desired to copy from the original tape a section with the first frame 0 hrs, 3 mins, 8 secs, frame 11 and the last frame 0 hrs, 3 mins, 52 secs frame-no 2, this section to be copied at a commencement time of 0 hrs, 1 min, 16 secs, frame-no 2.

The second tape machine has been set to omit the 8-field synchronization. The tapes are adjusted by being wound forwards or backwards as the case may be to a point corresponding to six seconds before cutting. It is now established whether or not 4-field synchronization is possible. This is effected by adding together in both instances the values of both seconds and frames, thereby obtaining in this case 19 and 54 respectively, the one thus being an odd number and the other an even number. Four-field synchronization is not therefore possible. This is equal to one of the cases $C_1$ or $C_2$ in Table I above. (If both values had been even or both odd the problem solved by the invention would have been non-existent in this case). Consequently, when transcribing in the case of the present example a signal is inverted in the control assembly of the second tape machine—as explained in more detail hereinafter. The tape machines are started and are driven synchronously during the start period found available and synchronism is achieved, whereafter the video signal is transcribed at the correct time in troublefree fashion, all control signals in the video signal being correct. The procedure then continues with a new scene, the tapes being adjusted to respective positions corresponding to six seconds prior to cutting, calculations are made, the tape machines started and transcription initiated, etc. . . . . The sequence between transcriptions from original to copy can be effected advantageously while avoiding long search times, since one has complete freedom of choice in the order in which copying is made. When all material to be copied from the first original tape has been transcribed, the procedure is continued with the next original tape, which is placed in the second tape machine.

We now arrive at the modification necessary in the play-back machine, the second tape machine, in accordance with the illustrative embodiment, in which a machine designated AMPEX VPR 2B is used. Reference is made in this respect to the manual entitled "VPR 2B Theory and Maintenance 1809477".

Figure 4:
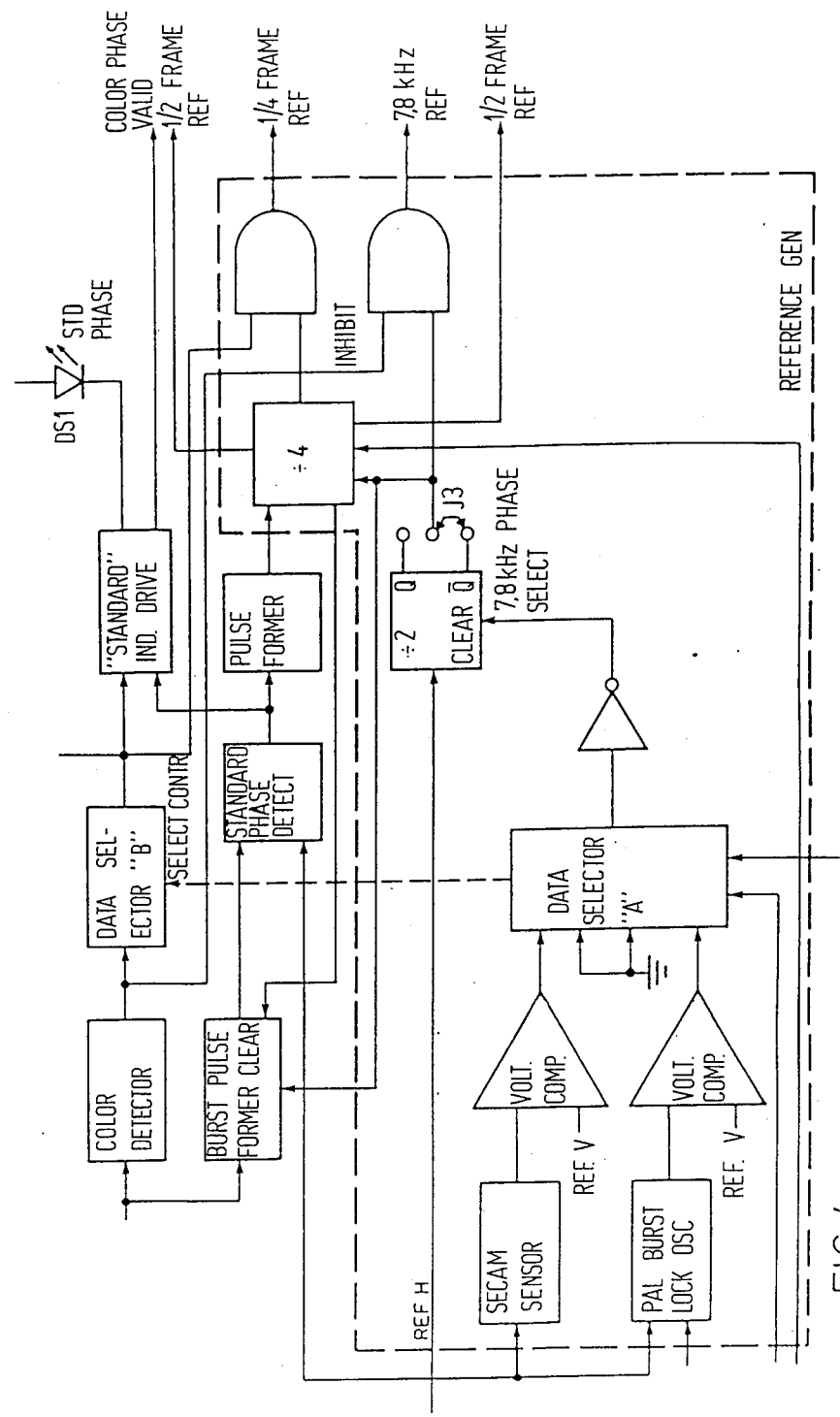
FIG. 4 shows part of a block schematic taken from a manual and illustrating a separate, non-limiting embodiment of the invention.

In order to be able to apply the method according to the invention it must be ensured that the phase of the signal corresponding to half the line frequency is inverted. FIG. 4, which is taken from FIGS. 2–54, Color Frames" of the aforesaid manual, shows part of a block schematic incorporating a reference generator which receives on its input horizontal reference signals (one per line) which are divided by two in a flip-flop or like device. As will be seen from the Figure, this flip-flop has two outputs which can be selectively coupled through a switch J3. In principle this switch can be used to effect re-phasing in accordance with the invention by hand. It is more natural, however, to effect this re-phasing automatically, which can be accomplished by replacing an integrated circuit 74 LS 157 (Texas Instruments) which can be controlled with an external signal from a microprocessor, in which case said processor can also be used to carry out the aforesaid "parity calculations". The principle establishment is thus the same as that illustrated in FIG. 3.

By then changing the phase of the 7.8 kHz-signal at an "erroneous frame sequence", the inventive effect is obtained by which it is possible to carry out the splice types $C_1$ and $C_2$ set forth in Table I.

This operation is carried out in the machine in which the original tapes are read-off, this machine being set-up as a "slave machine" in relation to the machine in which the final cut version is produced.

Although it is possible for one skilled in this art to convince himself of the validity of the invention by consulting the aforesaid manual, it may be suitable here to describe briefly those events which occur when transcribing.

The video signals (luminance and chrominance content) are converted in the play-back machine (the second machine) from analogue to digital signals and stored in separate line stores, from whence they are read out under time control to an analogue-digital-circuit and then, equipped with all control signals, transcribed. As a result of this synchronization there automatically occurs both the aforementioned "discarding" of one line and the lateral shift which takes place in a known manner also with splice type B, although with a different course, resulting in said lateral displacement. Quite surprisingly, when using such a machine set-up no further measures are necessary, and the desired "discard" of a first line in each frame is achieved automatically, as is evident from FIG. 2. This is effected by controlling the take-out from the separate line memories through the time base corrector so as to achieve the desired effect. This is consistent from a purely practical aspect with the fact that the information read-out from the play-back tape machine for enabling said time base correction constantly lies at some horizontal-line time units in advance of the read-in to the recording tape machine. The timing-controlled collection of information from the digital memories, arranged likewise, can therewith be effected by jumping one line, thereby enabling the inventive displacement through a distance of one line to be accomplished.

The invention is not restricted to the illustrated embodiment, however, but can be put into effect with other means, such as conventional time delay circuits, whereby it is possible, although with less simple expedients, to carry out the invention without needing to digitize the video signals.

Although the detailed example has only illustrated a single embodiment adapted to the PAL-system and to a given conventional tape machine designed for C-standard tapes, it will be obvious to those skilled in this art that the method can also be put into effect with the aid of other types of machine, and used for recordings in the SECAM-system. The method is probably of minor interest in respect to the American NTSC-system, since this system uses a frame frequency of 30 frames per second and consequently, as a result of the absence of any direct compatibility with the cinematographic frequency of 24 frames per second, uses field (half-frame) splices, wherewith the problems encountered are quite different.

It is a fact, however, that in the USA films are recorded at 30 frames per second to obtain an adaptation to the 30-frame system of television when transcribing to video, wherewith the same problem is met and the invention can also be applied to the NTSC-system.

What is claimed is:

1. A method for editing and splicing color videograms comprising:
   recording in a first video tape machine videogram sequences contained on a video tape in a second machine, said sequences including a first frame series terminated with a final frame, and a second frame series which begins with a first frame;
   determining when a first video line of said second series first frame has a chrominance coding the same as the last line of the last frame of said first frame series; and,
   shifting during each frame of said second frame series, each video line subsequent to the first video line forward, skipping said first video line, when said same chrominance coding between said last line of said first frame series and said first line of said second frame series is detected.

2. A method according to claim 1, wherein the video signal for each line is digitized and placed in one of a series of sequence memory stores to be read there from under timing control by a time base corrector, and reconverted to analogue signals and read into the video tape in the first tape machine, and said shifting is effected by reading each line out from said sequence memory in a sequence which is displaced by one line unit.

3. The method according to claim 2 further comprising the steps of:
   prior to recording in said first video tape machine, removing a recorded series of control signals and frame markings from said video tapes in said first and second machines;
   passing said removed control signals and frame markings to a control data processor; and, determining with said processor the chrominance codings of the last and first frames which constitute a cut, and when said chrominance codings are equal, reversing the phase of a control signal in said second tape machine.

4. A method according to claim 3, further comprising the step of: producing a copy of each video tape from which a videogram is to be taken during said editing process, which videograms are provided with supplementary video signals bearing frame-markings which are visible on play-back and which disclose time scales and frame numbers, playing back said tapes to determine which frame sequences shall be transcribed and the transcribing order, and establishing a list of the frame-markings of the first and the last frame of each such sequence, said list then being read into the control data-processor for controlling the first and the second tape machine.

5. A method according to claim 2, wherein a reference signal having a period of 7.8 kHz is phase changed through 180° in order to effect said shift.

* * * * *